United States Patent
Hu et al.

(10) Patent No.: US 10,721,047 B2
(45) Date of Patent: Jul. 21, 2020

(54) METHOD AND APPARATUS FOR IMPLEMENTING DATA TRANSMISSION

(71) Applicant: Huawei Technologies Co., Ltd., Shenzhen (CN)

(72) Inventors: Wenquan Hu, Lund (SE); Meng Hua, Shanghai (CN); Zongjie Wang, Shenzhen (CN); Weiming Duan, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 9 days.

(21) Appl. No.: 15/878,774

(22) Filed: Jan. 24, 2018

(65) Prior Publication Data
US 2018/0152276 A1 May 31, 2018

Related U.S. Application Data

(63) Continuation of application No. PCT/CN2015/085211, filed on Jul. 27, 2015.

(51) Int. Cl.
*H04J 11/00* (2006.01)
*H04L 5/00* (2006.01)
*H04L 27/26* (2006.01)

(52) U.S. Cl.
CPC .......... *H04L 5/0062* (2013.01); *H04L 5/0098* (2013.01); *H04L 27/26* (2013.01);
(Continued)

(58) Field of Classification Search
CPC . H04L 5/0062; H04L 5/0098; H04L 27/2605; H04L 27/2626; H04L 1/0033; H04L 5/0005; H04L 27/0601; H04L 27/26
See application file for complete search history.

(56) References Cited

U.S. PATENT DOCUMENTS 7,639,728 B2 * 12/2009 Laroia ........................ H04L 5/06
375/130
9,137,083 B1 * 9/2015 Lu ........................ H04L 27/2663
(Continued)

FOREIGN PATENT DOCUMENTS

CN 1691659 A 11/2005
CN 101394200 A 3/2009
(Continued)

*Primary Examiner* — Hanh N Nguyen
(74) *Attorney, Agent, or Firm* — Slater Matsil, LLP

(57) ABSTRACT

In certain embodiments, a method includes generating a first signal and a second signal. The first signal includes at least one first sub-signal, and the second signal includes at least one second sub-signal. A subcarrier frequency spacing of the first sub-signal is M times as large as a subcarrier frequency spacing of the second sub-signal. The method further includes separately sending each first sub-signal and each second sub-signal. In a range of a first preset frequency apart from a reference subcarrier frequency, all the second sub-signals sent on a subcarrier corresponding to a subcarrier frequency whose difference from the reference subcarrier frequency is a non-integer multiple of the subcarrier frequency spacing of the first signal are zero signals. The reference subcarrier frequency is a subcarrier frequency of the first sub-signal adjacent to the second signal in a frequency domain.

20 Claims, 9 Drawing Sheets

701

Generate a first signal to-be-sent and a second signal to-be-sent, where the first signal includes at least one first sub-signal, the second signal includes at least one second sub-signal, and a subcarrier frequency spacing of the first signal is M times as large as a subcarrier frequency spacing of the second signal, where M is a positive integer greater than 1

702

Perform the following operation on each first sub-signal: sending the first sub-signal carried on a subcarrier corresponding to a subcarrier frequency of the first sub-signal; and perform the following operation on each second sub-signal: sending the second sub-signal carried on a subcarrier corresponding to a subcarrier frequency of the second sub-signal, where in the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal, and all the second sub-signals sent on each subcarrier corresponding to a subcarrier frequency whose difference from the reference subcarrier frequency is a non-integer multiple of the subcarrier frequency spacing of the first sub-signal are zero signals, where the reference subcarrier frequency is a subcarrier frequency of the first sub-signal adjacent to the second signal in a frequency domain

(52) U.S. Cl.
CPC ...... *H04L 27/2602* (2013.01); *H04L 27/2605* (2013.01); *H04L 27/2626* (2013.01)

(56) References Cited

U.S. PATENT DOCUMENTS

2010/0296385 A1   11/2010   Li
2012/0287882 A1   11/2012   Kim et al.
2019/0098650 A1*   3/2019   Tang .................... H04L 1/0033

FOREIGN PATENT DOCUMENTS

| CN | 101399585 A | 4/2009 |
| EP | 2770686 A1 | 8/2014 |
| WO | 2014128019 A1 | 8/2014 |

\* cited by examiner

701

Generate a first signal to-be-sent and a second signal to-be-sent, where the first signal includes at least one first sub-signal, the second signal includes at least one second sub-signal, and a subcarrier frequency spacing of the first signal is M times as large as a subcarrier frequency spacing of the second signal, where M is a positive integer greater than 1

702

Perform the following operation on each first sub-signal: sending the first sub-signal carried on a subcarrier corresponding to a subcarrier frequency of the first sub-signal; and perform the following operation on each second sub-signal: sending the second sub-signal carried on a subcarrier corresponding to a subcarrier frequency of the second sub-signal, where in the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal, and all the second sub-signals sent on each subcarrier corresponding to a subcarrier frequency whose difference from the reference subcarrier frequency is a non-integer multiple of the subcarrier frequency spacing of the first sub-signal are zero signals, where the reference subcarrier frequency is a subcarrier frequency of the first sub-signal adjacent to the second signal in a frequency domain

FIG. 7

METHOD AND APPARATUS FOR IMPLEMENTING DATA TRANSMISSION

CROSS-REFERENCE TO RELATED APPLICATIONS

This application is a continuation of International Application No. PCT/CN2015/085211, filed on Jul. 27, 2015, which is hereby incorporated by reference in its entirety.

TECHNICAL FIELD

The present disclosure relates to the field of communications technologies, and in particular, to a method and an apparatus for implementing data transmission.

BACKGROUND

In a 5th Generation (5G) standard alternative, based on an existing orthogonal frequency division multiplexing (OFDM) system signal structure, OFDM symbols with different parameters are used in different carrier bands. For example, with an increase of a carrier frequency, a larger subcarrier spacing (or a larger length) and a shorter symbol period are used in the OFDM symbols. In a same transmission time interval (TTI), frequency resources are used in symbols with different subcarrier spacings in a frequency division manner. For example, symbols with subcarrier spacings of 15 KHz and 30 KHz on a frequency band are used for multiplexing of the frequency band.

Because orthogonality between signals cannot be maintained in OFDM symbols with different subcarrier spacings in a same time period, extremely high interference is generated between the symbols with the different subcarrier spacings. Currently, there is no effective method for reducing interference between the symbols with the different subcarrier spacings.

SUMMARY

Embodiments of the present disclosure provide a method and an apparatus for implementing data transmission, so as to reduce interference generated between symbols with different subcarrier spacings.

According to a first aspect, an embodiment of the present disclosure provides a method for implementing data transmission that includes generating a first signal to be sent. The first signal includes multiple first sub-signals. A subcarrier frequency spacing of each first sub-signal is M times as large as a subcarrier frequency spacing of each second sub-signal included in a second signal, M being a positive integer greater than 1. The second signal is adjacent to the first signal in a frequency domain. The method further includes performing the following operation on each first sub-signal: sending the first sub-signal carried on a subcarrier corresponding to a subcarrier frequency of the first sub-signal.

Generating a first signal to be sent includes at least one of the following solutions.

A first solution includes generating, according to at least one first modulation symbol and in the first signal, at least one first sub-signal sent on at least one subcarrier corresponding to a subcarrier frequency in a range of a first preset frequency apart from a reference subcarrier frequency. All of the at least one first modulation symbol are preset non-zero symbols, or some of the at least one first modulation symbol are preset non-zero symbols and the rest of the at least one first modulation symbol are zero symbols. The reference subcarrier frequency is a subcarrier frequency of the first sub-signal adjacent to the second signal in the frequency domain.

A second solution includes performing, in the first signal, the following operation on each subcarrier of at least one subcarrier corresponding to a subcarrier frequency in a range of a first preset frequency apart from a reference subcarrier frequency: generating M first sub-signals sent on the subcarrier. The M first sub-signals are continuous in a time domain and have a same subcarrier frequency, and phases of any two first sub-signals that are continuous in the time domain and that are in the M first sub-signals are continuous at a transition moment. The two first sub-signals that are continuous in the time domain include a previous first sub-signal and a subsequent first sub-signal, and the transition moment is a signal end moment of the previous first sub-signal and a signal start moment of the subsequent first sub-signal.

A third solution includes performing, in the first signal, the following operation on each subcarrier of at least one subcarrier corresponding to a subcarrier frequency in a range of a first preset frequency apart from a reference subcarrier frequency: generating, according to M first modulation symbols and on the subcarrier, M first sub-signals that are continuous in a time domain and that have a same subcarrier frequency. Amplitudes of the M first modulation symbols are the same, and a phase difference between any two adjacent first modulation symbols in the time domain in the M first modulation symbols is determined based on a time length of a cyclic prefix corresponding to a subsequent first modulation symbol in the two adjacent first modulation symbols.

With reference to the first aspect, in a first possible implementation of the first aspect, the phase difference is obtained by multiplying a subcarrier angular frequency corresponding to a previous first modulation symbol in the two adjacent first modulation symbols by the time length of the cyclic prefix corresponding to the subsequent first modulation symbol in the two adjacent first modulation symbols.

With reference to the first aspect or the first possible implementation of the first aspect, in a second possible implementation of the first aspect, generating M first sub-signals sent on the subcarrier includes generating, on the subcarrier, the M first sub-signals that are continuous in the time domain and that have the same subcarrier frequency. A start moment of a group of signals including the M first sub-signals is the same as a start moment of a second sub-signal.

According to a second aspect, an embodiment of the present disclosure provides a method for implementing data transmission that includes generating a second signal to be sent. The second signal includes multiple second sub-signals. A subcarrier frequency spacing of each first sub-signal included in a first signal is M times as large as a subcarrier frequency spacing of each second sub-signal, M being a positive integer greater than 1. The second signal is adjacent to the first signal in a frequency domain. The method further includes performing the following operation on each second sub-signal: sending the second sub-signal carried on a subcarrier corresponding to a subcarrier frequency of the second sub-signal. In the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal. All the second sub-signals sent on each subcarrier corresponding to a subcarrier frequency whose difference from the reference subcarrier frequency is a non-integer multiple of the subcarrier frequency spacing of the first sub-signal are zero signals. The reference subcarrier frequency is a subcarrier frequency of the first sub-signal adjacent to the second signal in the frequency domain.

With reference to the second aspect, in a first possible implementation of the second aspect, generating a second signal to be sent includes generating a second sub-signal to be sent on each subcarrier of the second signal. A start moment of a group of signals including M first sub-signals that are continuous in a time domain and that have a same subcarrier frequency is the same as a start moment of a second sub-signal to be sent.

With reference to the second aspect or the first possible implementation of the second aspect, in a second possible implementation of the second aspect, the method further includes the method according to any one of the first aspect, or the first to the second possible implementations of the first aspect.

According to a third aspect, an embodiment of the present disclosure further provides an apparatus for implementing data transmission The apparatus includes a processing unit that is configured to generate a first signal to be sent. The first signal includes multiple first sub-signals. A subcarrier frequency spacing of each first sub-signal is M times as large as a subcarrier frequency spacing of each second sub-signal included in a second signal, M being a positive integer greater than 1. The second signal is adjacent to the first signal in a frequency domain. A sending unit is configured to perform the following operation on each first sub-signal generated by the processing unit: sending the first sub-signal carried on a subcarrier corresponding to a subcarrier frequency of the first sub-signal.

The processing unit is configured to generate the first signal to be sent using at least one of the following solutions.

A first solution includes generating, according to at least one first modulation symbol and in the first signal, at least one first sub-signal sent on at least one subcarrier corresponding to a subcarrier frequency in a range of a first preset frequency apart from a reference subcarrier frequency. All of the at least one first modulation symbol are preset non-zero symbols, or some of the at least one first modulation symbol are preset non-zero symbols, and the rest of the at least one first modulation symbol are zero symbols. The reference subcarrier frequency is a subcarrier frequency of the first sub-signal adjacent to the second signal in the frequency domain.

A second solution includes performing, in the first signal, the following operation on each subcarrier of at least one subcarrier corresponding to a subcarrier frequency in a range of a first preset frequency apart from a reference subcarrier frequency: generating M first sub-signals sent on the subcarrier. The M first sub-signals are continuous in a time domain and have a same subcarrier frequency, and phases of any two first sub-signals that are continuous in the time domain and that are in the M first sub-signals are continuous at a transition moment. The two first sub-signals that are continuous in the time domain include a previous first sub-signal and a subsequent first sub-signal, and the transition moment is a signal end moment of the previous first sub-signal and a signal start moment of the subsequent first sub-signal.

A third solution includes performing, in the first signal, the following operation on each subcarrier of at least one subcarrier corresponding to a subcarrier frequency in a range of a first preset frequency apart from a reference subcarrier frequency: generating, according to M first modulation symbols and on the subcarrier, M first sub-signals that are continuous in a time domain and that have a same subcarrier frequency. Amplitudes of the M first modulation symbols are the same, and a phase difference between any two adjacent first modulation symbols in the time domain in the M first modulation symbols is determined based on a time length of a cyclic prefix corresponding to a subsequent first modulation symbol in the two adjacent first modulation symbols.

With reference to the third aspect, in a first possible implementation of the third aspect, the phase difference is obtained by multiplying a subcarrier angular frequency corresponding to a previous first modulation symbol in the two adjacent first modulation symbols by the time length of the cyclic prefix corresponding to the subsequent first modulation symbol in the two adjacent first modulation symbols.

With reference to the third aspect or the first possible implementation of the third aspect, in a second possible implementation of the third aspect, when generating the M first sub-signals sent on the subcarrier, the processing unit is configured to generate, on the subcarrier, the M first sub-signals that are continuous in the time domain and that have the same subcarrier frequency. A start moment of a group of signals including the M first sub-signals is the same as a start moment of a second sub-signal.

According to a fourth aspect, an embodiment of the present disclosure further provides an apparatus for implementing data transmission. The apparatus includes a processing unit configured to generate a second signal to be sent. The second signal includes multiple second sub-signals. A subcarrier frequency spacing of each first sub-signal included in a first signal is M times as large as a subcarrier frequency spacing of each second sub-signal, M being a positive integer greater than 1. The second signal is adjacent to the first signal in a frequency domain. The apparatus includes a sending unit configured to perform the following operation on each second sub-signal generated by the processing unit: sending the second sub-signal carried on a subcarrier corresponding to a subcarrier frequency of the second sub-signal. In the second signal and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal All the second sub-signals sent on each subcarrier corresponding to a subcarrier frequency whose difference from the reference subcarrier frequency is a non-integer multiple of the subcarrier frequency spacing of the first sub-signal are zero signals. The reference subcarrier frequency is a subcarrier frequency of the first sub-signal adjacent to the second signal in the frequency domain.

With reference to the fourth aspect, in a first possible implementation of the fourth aspect, the processing unit is configured to generate a second sub-signal to be sent on each subcarrier of the second signal. A start moment of a group of signals including M first sub-signals that are continuous in a time domain and that have a same subcarrier frequency is the same as a start moment of a second sub-signal to be sent.

With reference to the fourth aspect or the first possible implementation of the fourth aspect, in a second possible implementation of the fourth aspect, the processing unit is further configured to implement a function implemented by the processing unit according to any one of the third aspect, or the first to the second possible implementations of the third aspect, and the sending unit is further configured to implement a function implemented by the sending unit according to any one of the third aspect, or the first to the second possible implementations of the third aspect.

According to the solutions provided in the embodiments of the present disclosure, in a range of a first preset frequency apart from a reference subcarrier frequency, a second signal is sent on a subcarrier corresponding to a subcarrier frequency whose difference from the reference subcarrier frequency is an integer multiple of subcarrier frequency spacing of a first signal, and no signal is sent on the rest of subcarriers. This may ensure that the second signal does not interfere with the first signal in the range of the first preset frequency apart from the reference subcarrier frequency, so as to avoid a waste of frequency resources caused when no signal is sent within a frequency guard band. In addition, the first signal including all first sub-signals generated according to a preset non-zero symbol may be used for channel estimation and measurement. The first signal may be used as a pilot signal or a reference signal. Because the second signal does not interfere with the first signal, after the first signal and the second signal are received, the first signal may be correctly demodulated. Alternatively, by ensuring that phases of any two adjacent first sub-signals in M first sub-signals that are continuous in a time domain and that have a same subcarrier frequency are continuous at a transition moment, in a range of a first preset frequency apart from the reference subcarrier frequency, the sent first signal is orthogonal to the sent second signal, so as to reduce interference of the first signal to the second signal.

BRIEF DESCRIPTION OF THE DRAWINGS

FIG. 7 is a flowchart of still another method for implementing data transmission according to an embodiment of the present disclosure;

DETAILED DESCRIPTION OF ILLUSTRATIVE EMBODIMENTS

To make the objectives, technical solutions, and advantages of the present disclosure clearer, the following further describes the present disclosure in detail with reference to the accompanying drawings. The described embodiments are merely a part rather than all of the embodiments of the present disclosure.

Embodiments of the present disclosure provide a data transmission method and a device, so as to reduce interference generated between symbols with different subcarrier spacings. The method and the device are based on a same inventive concept. Because a principle of resolving a problem of the method is similar to that of the device, implementation of the device and implementation of the method may be cross-referenced without providing a repeated description.

As shown in FIG. 1A and FIG. 1B, and FIG. 2A and FIG. 2B, a symbol with a subcarrier frequency spacing of 30 KHz and a symbol with a subcarrier frequency spacing of 15 KHz are used as examples. For ease of subsequent description, each symbol with a subcarrier spacing of 30 KHz is referred to as a first symbol, and each symbol with a subcarrier spacing of 15 KHz is referred to as a second symbol.

It should be noted that, to prevent mutual interference between all symbols with a same subcarrier frequency spacing, a cyclic prefix of a specific time length is added before each symbol. For details, refer to an implementation in the prior art. The present disclosure is not limited to such an example. In addition, a signal including a first symbol with a time length of T1 plus a cyclic prefix with a time length of Tcp1 is referred to as a first signal, and a signal including a second symbol with a time length of T0 plus a cyclic prefix with a time length of Tcp0 is referred to as a second signal.

Figure 1A:
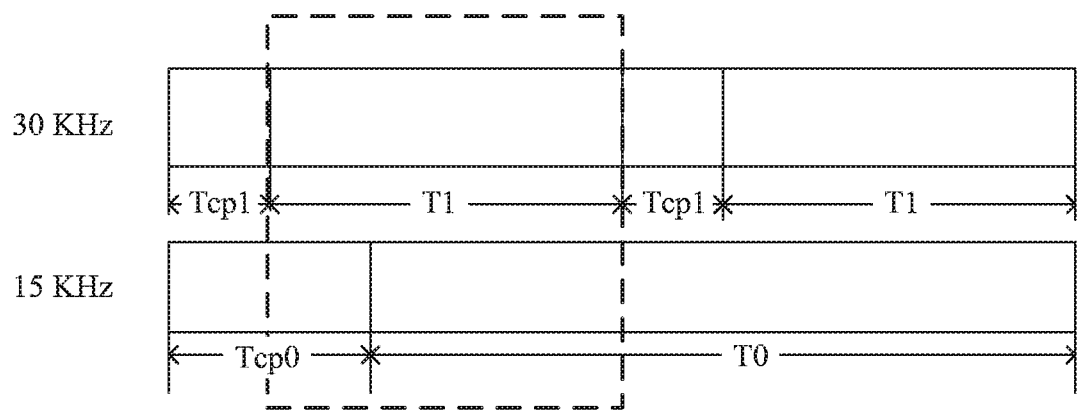
FIG. 1A is a time-domain schematic diagram of a signal with a subcarrier frequency spacing of 30 KHz and a signal with a subcarrier frequency spacing of 15 KHz that are obtained when a complete symbol with a subcarrier frequency spacing of 30 KHz is truncated according to an embodiment of the present disclosure.
Figure 1B:
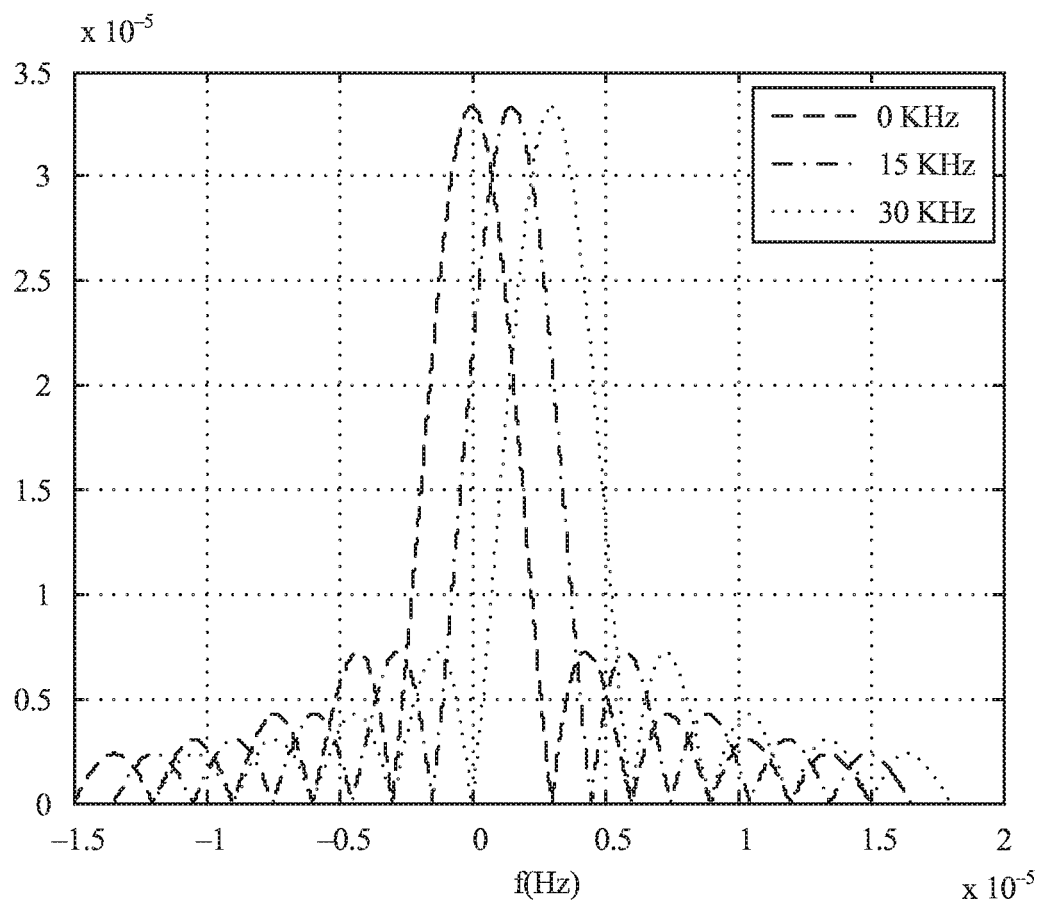
FIG. 1B is a frequency-domain waveform graph that is of a signal with a subcarrier frequency spacing of 30 KHz and a signal with a subcarrier frequency spacing of 15 KHz and that corresponds to the time-domain schematic diagram of FIG. 1A according to an embodiment of the present disclosure.

As shown in FIG. 1A, a first signal with a subcarrier frequency spacing of 30 KHz is analyzed. A time length of a complete first symbol is truncated in a time domain. Because a time length in the time domain is equal to a reciprocal of a subcarrier frequency spacing, a time length of a complete first symbol in the time domain is equal to half of a time length of a second symbol. As shown in FIG. 1B, from a perspective of a frequency domain, each signal that is in the first signal and whose subcarrier frequency has a distance of an integer multiple of 30 KHz (a subcarrier frequency spacing or a length of the first symbol) from a subcarrier frequency of a second signal is orthogonal to the second signal. Each signal that is in the first signal and whose subcarrier frequency has a distance of a non-integer multiple of 30 KHz from a subcarrier frequency of a second signal is non-orthogonal to the second signal. However, when a distance between subcarrier frequencies of the first signal and the second signal is larger, generated interference is lower.

If two signals are orthogonal to each other, it indicates that there is no interference between the two signals. If two signals are non-orthogonal to each other, it indicates that there is interference between the two signals.

Figure 2A:
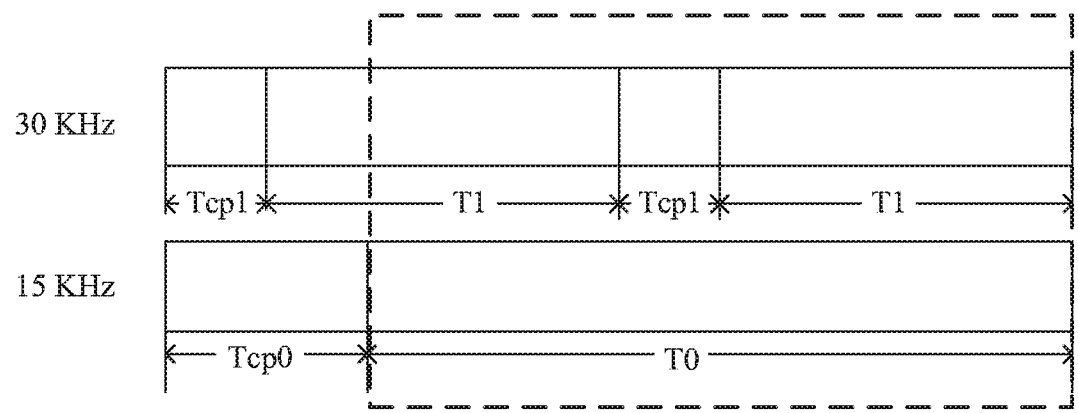
FIG. 2A is a time-domain schematic diagram of a signal with a subcarrier frequency spacing of 30 KHz and a signal with a subcarrier frequency spacing of 15 KHz that are obtained when a complete symbol with a subcarrier frequency spacing of 15 KHz is truncated according to an embodiment of the present disclosure.
Figure 2B:
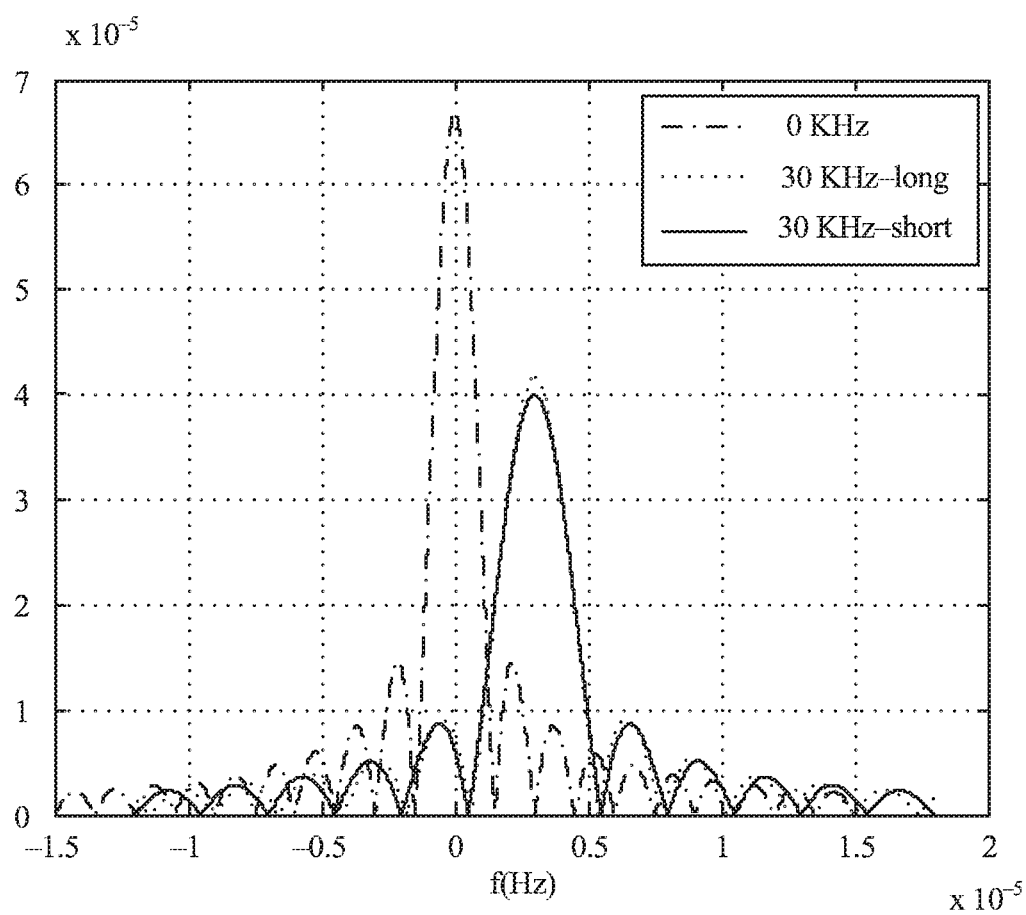
FIG. 2B is a frequency-domain waveform graph that is of a signal with a subcarrier frequency spacing of 30 KHz and a signal with a subcarrier frequency spacing of 15 KHz and that corresponds to the time-domain schematic diagram of FIG. 2A according to an embodiment of the present disclosure.

As shown in FIG. 2A, a second signal with a subcarrier frequency spacing of 15 KHz is analyzed. A time length of a complete second symbol is truncated in a time domain. Because a time length in the time domain is equal to a reciprocal of a subcarrier frequency spacing, a time length of a complete second symbol in the time domain is equal to a time length of two first symbols. As shown in FIG. 2B, from a perspective of a frequency domain, a first signal is non-orthogonal to a second signal.

Therefore, a conclusion is obtained as follows: In case of time alignment, when a distance between a subcarrier frequency of the second signal and a subcarrier frequency of the first signal is an integer multiple of 30 KHz, interference of the second signal to the first signal is extremely low, but the second signal is still interfered with by the first signal.

Figure 3:
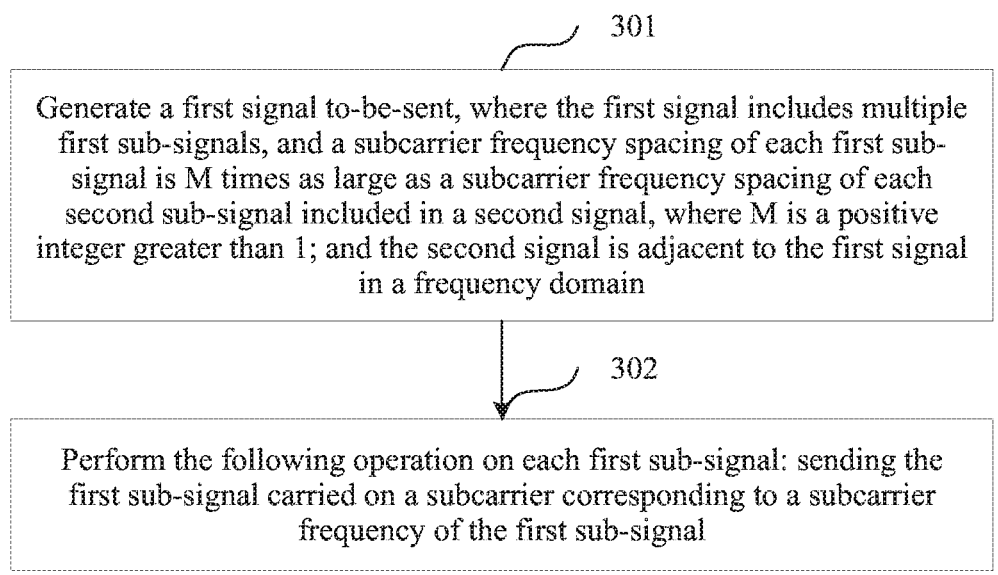
FIG. 3 is a flowchart of a method for implementing data transmission according to an embodiment of the present disclosure.

Based on the foregoing findings, an embodiment of the present disclosure provides a method for implementing data transmission. As shown in FIG. 3, the method includes:

Step 301: Generate a first signal to be sent. The first signal includes multiple first sub-signals. A subcarrier frequency spacing of each first sub-signal is M times as large as a subcarrier frequency spacing of each second sub-signal included in a second signal, M being a positive integer greater than 1. The second signal is adjacent to the first signal in a frequency domain.

Step 302: Perform the following operation on each first sub-signal: sending the first sub-signal carried on a subcarrier corresponding to a subcarrier frequency of the first sub-signal.

Generating a first signal to be sent includes at least one of the following solutions:

A first solution includes generating, according to at least one first modulation symbol and in the first signal, at least one first sub-signal sent on at least one subcarrier corresponding to a subcarrier frequency in a range of a first preset frequency apart from a reference subcarrier frequency. All of the at least one first modulation symbol are preset non-zero symbols, or some of the at least one first modulation symbol are preset non-zero symbols, and the rest of the at least one first modulation symbol are zero symbols. The reference subcarrier frequency is a subcarrier frequency of the first sub-signal adjacent to the second signal in the frequency domain.

For the first signal with the subcarrier frequency spacing of 30 KHz, when a distance between subcarrier frequencies of the first signal and the second signal is larger, interference of the second signal to the first signal becomes lower. Therefore, the first preset frequency meets the following condition: When the distance between the subcarrier frequencies of the first signal and the second signal is greater than the first preset frequency, the interference may be ignored.

It should be noted that sending of the first signal may not be limited outside the range of the first preset frequency apart from the reference subcarrier frequency.

Therefore, the first signal including all the first sub-signals generated according to the preset non-zero symbol may be used for channel estimation and measurement. For example, the first signal may be used as a pilot signal or a reference signal. Because the second signal does not interfere with the first signal, after the first signal and the second signal are received, the first signal may be correctly demodulated, and then the first signal is canceled as an interference signal and the second signal is successfully demodulated.

Figure 4:
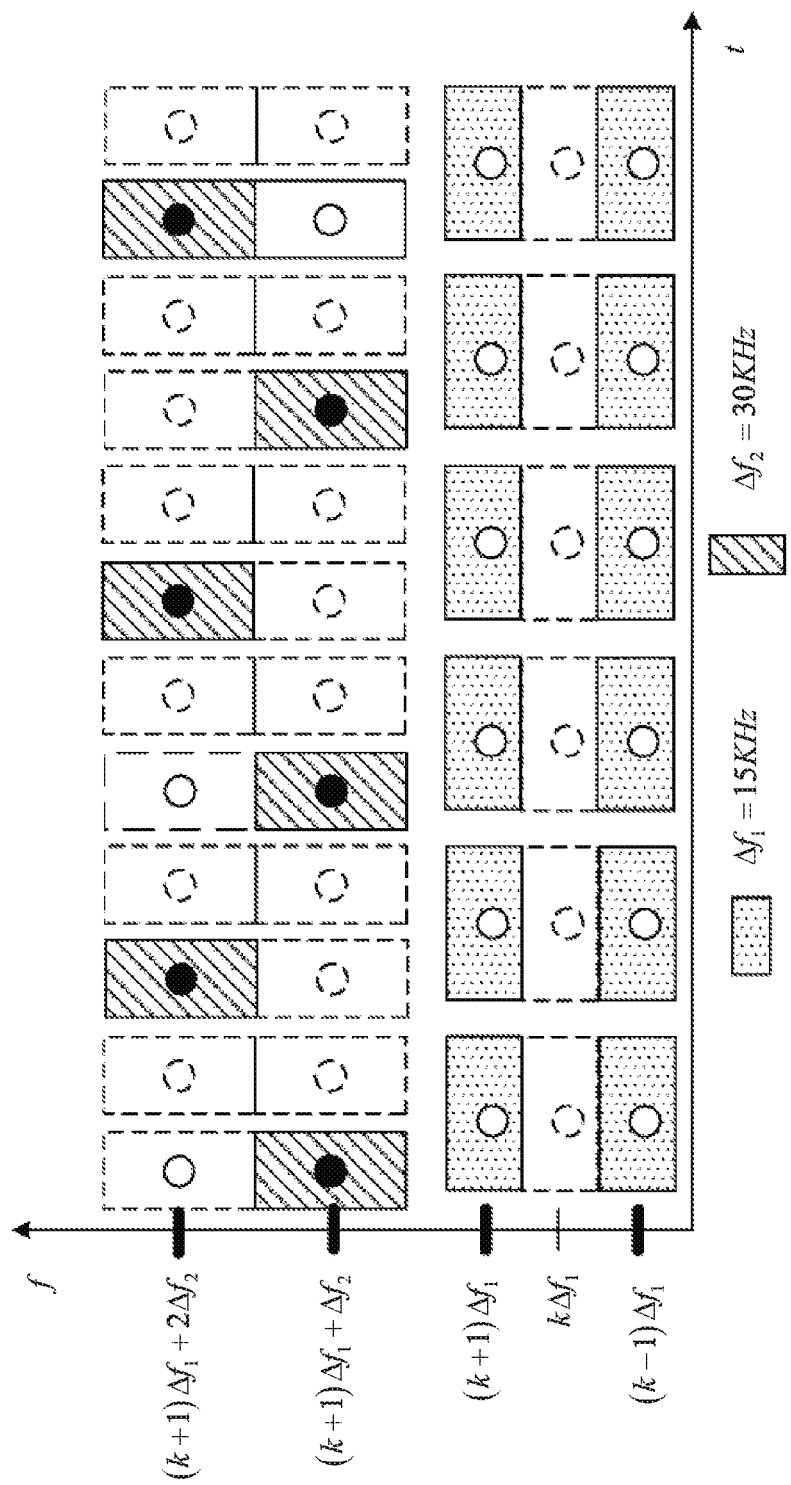
FIG. 4 is a schematic diagram of a signal with a subcarrier frequency spacing of 30 KHz and a signal with a subcarrier frequency spacing of 15 KHz according to an embodiment of the present disclosure.

Therefore, a pattern in which the first signal is sent may be a pattern shown in FIG. 4. In FIG. 4, a subcarrier frequency spacing of a first signal of 30 KHz and a subcarrier frequency spacing of a second signal of 15 KHz are used as examples. In addition, in a time domain, a start moment of a signal group including two first signals is the same as a start moment of a second signal.

A second solution includes performing, in the first signal, the following operation on each subcarrier of at least one subcarrier corresponding to a subcarrier frequency in a range of a first preset frequency apart from a reference subcarrier frequency: generating M first sub-signals sent on the subcarrier. The M first sub-signals are continuous in a time domain and have a same subcarrier frequency. Phases of any two first sub-signals that are continuous in the time domain and that are in the M first sub-signals are continuous at a transition moment. The two first sub-signals that are continuous in the time domain include a previous first sub-signal and a subsequent first sub-signal. The transition moment is a signal end moment of the previous first sub-signal and a signal start moment of the subsequent first sub-signal.

Specifically, that the signal phases of the any two adjacent first sub-signals in the M first sub-signals at the transition moment are continuous means that, from a perspective of a waveform in the time domain, any two first sub-signals that are continuous in the time domain are a continuous signal without a point of discontinuity.

By ensuring that the phases of any two adjacent first sub-signals in the M first sub-signals that are continuous in the time domain and that have the same subcarrier frequency at the transition moment are continuous, in a range of a first preset frequency apart from the reference subcarrier frequency, the sent first signal is orthogonal to the sent second signal, so as to reduce interference of the first signal to the second signal.

In the time domain, the following third solution may be used to ensure that the phases of any two adjacent first sub-signals in the M first sub-signals that are continuous in the time domain and that have the same subcarrier frequency at the transition moment are continuous.

A third solution includes performing, in the first signal, the following operation on each subcarrier of at least one subcarrier corresponding to a subcarrier frequency in a range of a first preset frequency apart from a reference subcarrier frequency: generating, according to M first modulation symbols and on the subcarrier, M first sub-signals that are continuous in a time domain and that have a same subcarrier frequency.

Amplitudes of the M first modulation symbols are the same, and a phase difference between any two adjacent first modulation symbols in the time domain in the M first modulation symbols is determined based on a time length of a cyclic prefix corresponding to a subsequent first modulation symbol in the two adjacent first modulation symbols.

Further, the phase difference is obtained by multiplying a subcarrier angular frequency corresponding to a previous first modulation symbol in the two adjacent first modulation symbols by the time length of the cyclic prefix corresponding to the subsequent first modulation symbol in the two adjacent first modulation symbols.

Further, the M first sub-signals that are continuous in the time domain and that have the same subcarrier frequency and a second sub-signal to be sent are generated. A start moment of a group of signals including the M first sub-signals is the same as a start moment of the second sub-signal. This can ensure that two signals are time-aligned when being sent, so as to avoid interference caused because signals with different subcarrier frequency spacings are not time-aligned.

For example, it is assumed that a signal that is of a symbol with a subcarrier frequency spacing of $f_0$ Hz and that is obtained after a length of a cyclic prefix CP is added to a length of a symbol period of the symbol with the subcarrier frequency spacing of $f_0$ Hz is as follows:

$$s_1(t) = e^{jk2\pi f_0(t-T_{cp})}, 0 \le t < T_0 + T_{cp}, \text{ where}$$

$$T_0 = \frac{1}{f_0},$$

and represents a symbol period;
$f_0$ $f_0$ represents subcarrier frequency spacing;
k k represents an integer value;
t t represents a time independent variable; and
$T_{cp}$ $T_{cp}$ represents a time length of a cyclic prefix.

A signal that is of a symbol with a subcarrier frequency spacing of $Mf_0$ Hz adjacent to the foregoing signal and that is obtained after a length of the CP is added to a length of a symbol period of the symbol with the subcarrier frequency spacing of $Mf_0$ Hz is as follows:

$$s_M(t) = e^{j(k+M)2\pi f_0\left(t-\frac{T_{cp}}{M}\right)}, 0 \le t < \frac{T_0 + T_{cp}}{M},$$

where
M is a positive integer greater than 1.
Obviously, a signal with a $$\frac{T_0}{M}$$

time length is truncated in $$0 \le t < \frac{T_0 + T_{cp}}{M},$$

and $s_M(t)$ is orthogonal to $s_1(t)$.

To truncate a signal with a $T_0$ time length in $0 \le t < T_0 + T_{cp}$, M signals with the subcarrier frequency spacing of $Mf_0$ Hz (including a CP) are orthogonal to $s_1(t)$, and the M signals with the subcarrier frequency spacing of $Mf_0$ Hz may be constructed, as shown in the following expression:

$$s'_M(t) = e^{j(k+M)2\pi f_0\left(t-\frac{T_{cp}}{M}\right)}, 0 \le t < T_0 + T_{cp}.$$

That is, in the $0 \le t < T_0 + T_{cp}$ time, when the signal with the $T_0$ time length is truncated, an inner product of $s'_M(t)$ and $s_1(t)$ is O ($s'_M(t)$ is orthogonal to $s_1(t)$).

$s'_M(t)$ A signal phase of $s'_M(t)$ in $$t = p\frac{T_0 + T_{cp}}{M}, p = 0, 1, \ldots, M-1$$

is as follows:

$$\phi(p) = 2\pi f_0 \frac{(k+M)(pT_0 + (p-1)T_{cp})}{M};$$

or a signal phase of $s'_M(t)$ in $$t = \frac{T_{cp}}{M} + p\frac{T_0 + T_{cp}}{M}, p = 0, 1, \ldots, M-1$$

is as follows:

$$\phi(p) = 2\pi f_0 \frac{p(k+M)(T_0 + T_{cp})}{M}.$$

Therefore, it may be learned from the foregoing expression that phases of the M continuous signals with the subcarrier frequency spacing of $Mf_0$ Hz in the time domain are continuous.

Figure 5:
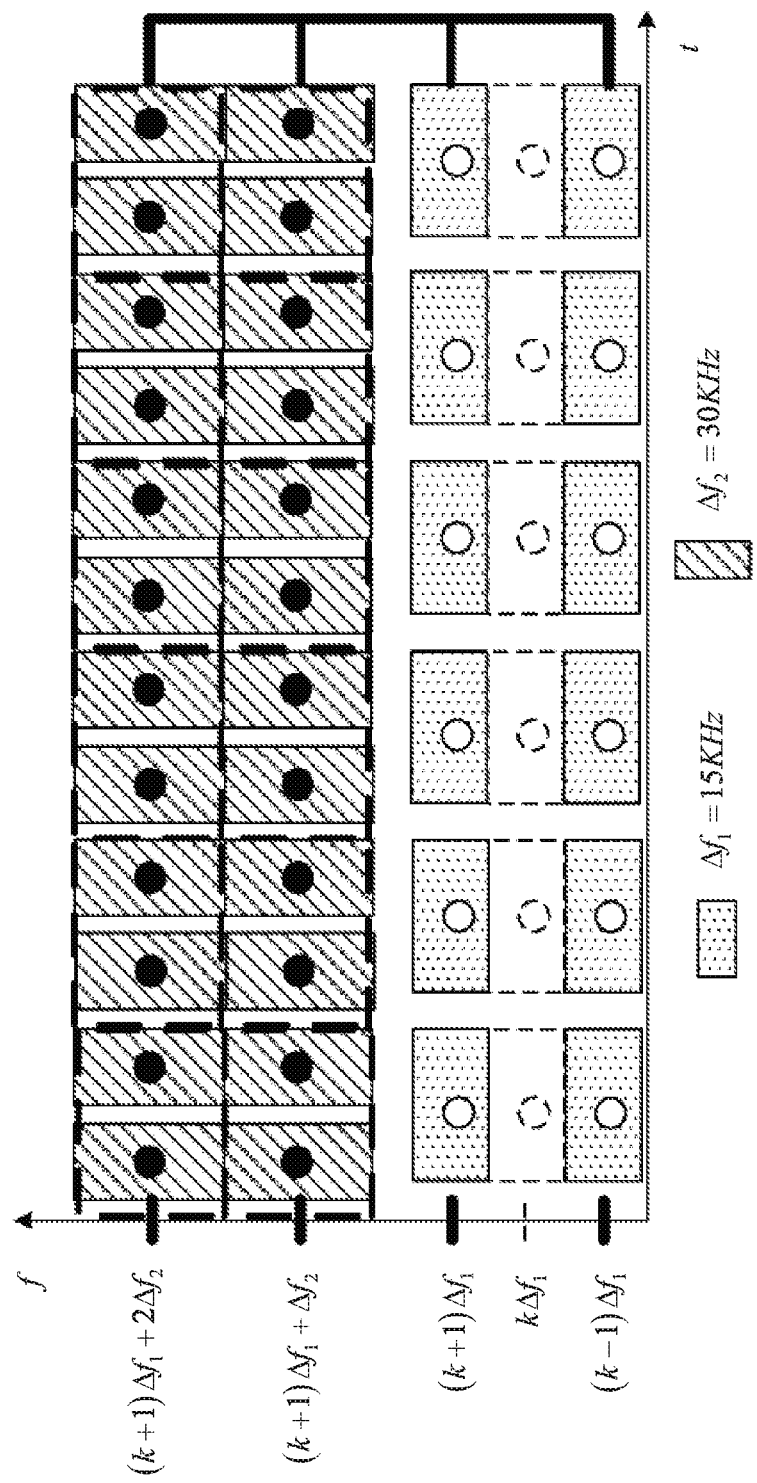
FIG. 5 is another schematic diagram of a signal with a subcarrier frequency spacing of 30 KHz and a signal with a subcarrier frequency spacing of 15 KHz according to an embodiment of the present disclosure.

Therefore, by ensuring that phases of any two adjacent first sub-signals in the M first sub-signals that are continuous in the time domain and that have the same subcarrier frequency are continuous at a transition moment, in a range of a first preset frequency apart from the reference subcarrier frequency, the sent first signal is orthogonal to the sent second signal. For example, as shown in FIG. 5, a first signal having a subcarrier frequency spacing of 30 KHz and a second signal having a subcarrier frequency spacing of 15 KHz are used as examples. That is, M=2.

That phases of M continuous signals with a subcarrier frequency spacing of $Mf_0$ Hz in a time domain are continuous may be ensured by generating, according to M first modulation symbols, M first sub-signals that are continuous in the time domain and that have a same subcarrier frequency.

Amplitudes of the M first modulation symbols are the same, and a phase difference between any two adjacent first modulation symbols in the time domain in the M first modulation symbols is determined based on a time length of a cyclic prefix corresponding to a subsequent first modulation symbol in the two adjacent first modulation symbols.

Further, the phase difference is obtained by multiplying a subcarrier angular frequency corresponding to a previous first modulation symbol in the two adjacent first modulation symbols by the time length of the cyclic prefix corresponding to the subsequent first modulation symbol in the two adjacent first modulation symbols.

Specifically, if the M modulation symbols are where $x(n)e^{j\phi(p)}$, where p=0, 1, . . . , M−1, and $$\phi(p) = 2\pi f_0 \frac{p(k+M)(T_0 + T_{cp})}{M},$$

the generated M first sub-signals are $$\tilde{x}_p(t) = x(n)e^{j(k+M)2\pi f_0\left(t-\frac{T_{cp}}{M}\right)},$$

$$\frac{p(T_0+T_{cp})}{M} \le t < \frac{(p+1)(T_0+T_{cp})}{M},$$

$$p = 0, 1, \ldots, M-1,$$

where x(n) is a symbol generated by means of digital modulation.

Further, the M first sub-signals that are continuous in the time domain and that have the same subcarrier frequency and a second sub-signal to be sent are generated. A start moment of a group of signals including the M first sub-signals is the same as a start moment of the second sub-signal. This can ensure that two signals are time-aligned when being sent, so as to avoid interference caused because signals with different subcarrier frequency spacings are not time-aligned.

Figure 6:
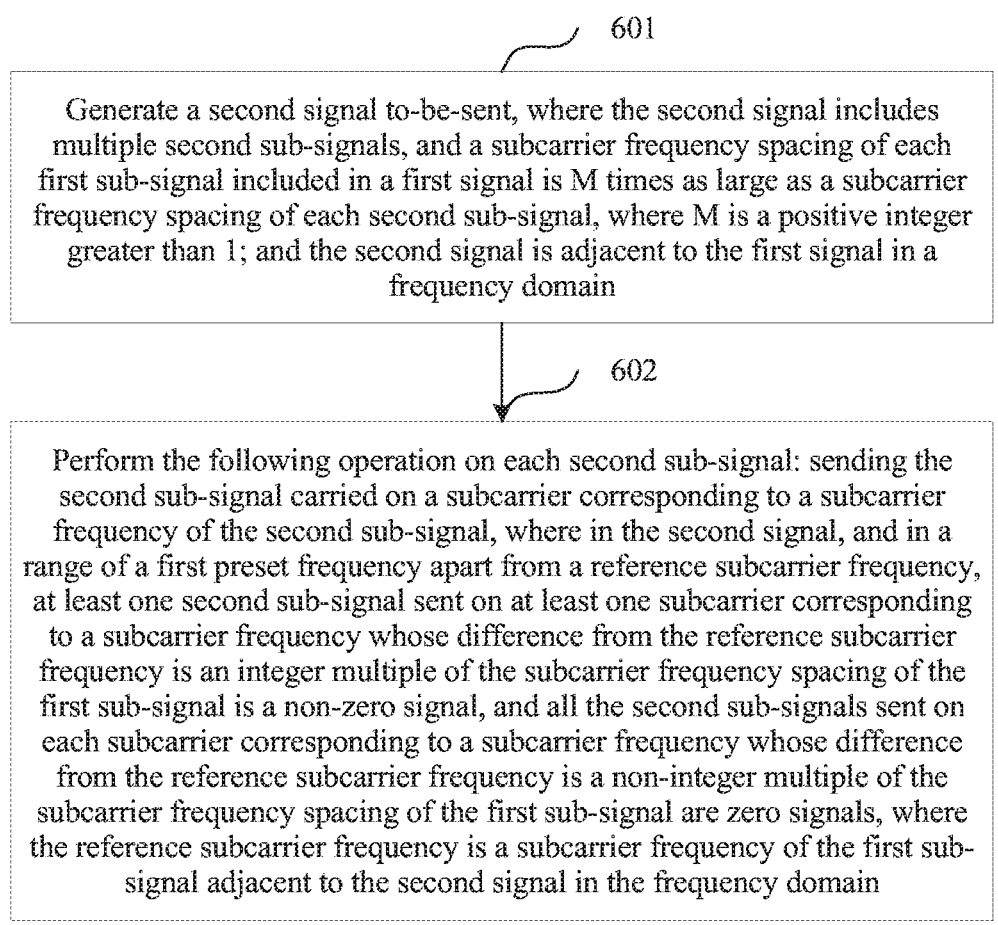
FIG. 6 is a flowchart of another method for implementing data transmission according to an embodiment of the present disclosure.

An embodiment of the present disclosure further provides a method for implementing data transmission. As shown in FIG. 6, the method includes:

Step 601: Generate a second signal to be sent. The second signal includes multiple second sub-signals. A subcarrier frequency spacing of each first sub-signal included in a first signal is M times as large as a subcarrier frequency spacing of each second sub-signal, M being a positive integer greater than 1. The second signal is adjacent to the first signal in a frequency domain.

Step 602: Perform the following operation on each second sub-signal: sending the second sub-signal carried on a subcarrier corresponding to a subcarrier frequency of the second sub-signal. In the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal. All the second sub-signals sent on each subcarrier corresponding to a subcarrier frequency whose difference from the reference subcarrier frequency is a non-integer multiple of the subcarrier frequency spacing of the first sub-signal are zero signals. The reference subcarrier frequency is a subcarrier frequency of the first sub-signal adjacent to the second signal in the frequency domain.

In this embodiment, the first preset frequency may be the same as or may be different from the first preset frequency shown in FIG. 3.

In case of time alignment, when a distance between a subcarrier frequency of the second signal and a subcarrier frequency of the first signal is an integer multiple of 30 KHz, interference of the second signal to the first signal is extremely low. Therefore, the interference of the second signal to the first signal can be reduced using a solution provided in this embodiment of the present disclosure.

For the first signal with the subcarrier frequency spacing of 30 KHz, when a distance between subcarrier frequencies of the first signal and the second signal is larger, interference of the second signal to the first signal becomes lower. Therefore, the first preset frequency meets the following condition: When the distance between the subcarrier frequencies of the first signal and the second signal is greater than the first preset frequency, the interference may be ignored.

It should be noted that sending of the first signal may not be limited outside the range of the first preset frequency apart from the reference subcarrier frequency.

According to the solution provided in this embodiment of the present disclosure, in a range of a first preset frequency apart from a reference subcarrier frequency, a second signal is sent on a subcarrier corresponding to a subcarrier frequency whose difference from the reference subcarrier frequency is an integer multiple of subcarrier frequency spacing of a first signal, and no signal is sent on the rest of subcarriers. This can ensure that the second signal does not interfere with the first signal in the range of the first preset frequency apart from the reference subcarrier frequency, so as to avoid a waste of frequency resources caused when no signal is sent within a frequency guard band.

A condition of time alignment may be met by generating a second sub-signal to be sent on each subcarrier of the second signal.

A start moment of a group of signals including M first sub-signals that are continuous in a time domain and that have a same subcarrier frequency is the same as a start moment of a second sub-signal to be sent.

An embodiment of the present disclosure further provides a method for implementing data transmission. As shown in FIG. 7, the method includes:

Step 701: Generate a first signal to be sent and a second signal to be sent. The first signal includes at least one first sub-signal, the second signal includes at least one second sub-signal, and a subcarrier frequency spacing of the first signal is M times as large as a subcarrier frequency spacing of the second signal. M is a positive integer greater than 1.

Step 702: Perform the following operation on each first sub-signal: sending the first sub-signal carried on a subcarrier corresponding to a subcarrier frequency of the first sub-signal. Perform the following operation on each second sub-signal: sending the second sub-signal carried on a subcarrier corresponding to a subcarrier frequency of the second sub-signal. In the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal. All the second sub-signals sent on each subcarrier corresponding to a subcarrier frequency whose difference from the reference subcarrier frequency is a non-integer multiple of the subcarrier frequency spacing of the first sub-signal are zero signals. The reference subcarrier frequency is a subcarrier frequency of the first sub-signal adjacent to the second signal in a frequency domain.

All the second sub-signals sent on the subcarrier corresponding to the subcarrier frequency whose difference from the reference subcarrier frequency is the non-integer multiple of the subcarrier frequency spacing of the first signal are the zero signals. That is, no signal is sent on the subcarrier corresponding to the subcarrier frequency whose difference from the reference subcarrier frequency is the non-integer multiple of the subcarrier frequency spacing of the first signal.

For the first signal with the subcarrier frequency spacing of 30 KHz, when a distance between subcarrier frequencies of the first signal and the second signal is larger, interference of the second signal to the first signal becomes lower.

Therefore, the first preset frequency meets the following condition: When the distance between the subcarrier frequencies of the first signal and the second signal is greater than the first preset frequency, the interference may be ignored.

It should be noted that sending of the first signal and the second signal may not be limited outside the range of the first preset frequency apart from the reference subcarrier frequency.

Therefore, according to the solution provided in this embodiment of the present disclosure, in a range of a first preset frequency apart from a reference subcarrier frequency, a second signal is sent on a subcarrier corresponding to a subcarrier frequency whose difference from the reference subcarrier frequency is an integer multiple of subcarrier frequency spacing of a first signal, and no signal is sent on the rest of subcarriers. This can ensure that the second signal does not interfere with the first signal in the range of the first preset frequency apart from the reference subcarrier frequency, so as to avoid a waste of frequency resources caused when no signal is sent within a frequency guard band.

Optionally, generating a first signal to be sent includes generating, according to at least one first modulation symbol and in the first signal, at least one first sub-signal sent on at least one subcarrier corresponding to a subcarrier frequency in a range of a first preset frequency apart from a reference subcarrier frequency. All of the at least one first modulation symbol are preset non-zero symbols, or some of the at least one first modulation symbol are preset non-zero symbols and the rest of the at least one first modulation symbol are zero symbols. The reference subcarrier frequency is a subcarrier frequency of the first sub-signal adjacent to the second signal in the frequency domain.

A second preset frequency may be equal to the first preset frequency or may be greater than the first preset frequency.

Therefore, the first signal including all the first sub-signals generated according to the preset non-zero symbol may be used for channel estimation and measurement. For example, the first signal may be used as a pilot signal or a reference signal. Because the second signal does not interfere with the first signal, after the first signal and the second signal are received, the first signal may be correctly demodulated, and then the first signal is canceled as an interference signal and the second signal is successfully demodulated.

Therefore, a pattern in which the first signal and the second signal are sent may be a pattern shown in FIG. 4. In FIG. 4, a subcarrier frequency spacing of a first signal of 30 KHz and a subcarrier frequency spacing of a second signal of 15 KHz are used as examples. In addition, in a time domain, a start moment of a signal group including two first signals is the same as a start moment of a second signal.

Optionally, generating a first signal to be sent includes performing, in the first signal, the following operation on each subcarrier of at least one subcarrier corresponding to a subcarrier frequency in a range of a first preset frequency apart from a reference subcarrier frequency: generating M first sub-signals sent on the subcarrier. The M first sub-signals are continuous in a time domain and have a same subcarrier frequency, and phases of any two first sub-signals that are continuous in the time domain and that are in the M first sub-signals are continuous at a transition moment. The two first sub-signals that are continuous in the time domain include a previous first sub-signal and a subsequent first sub-signal, and the transition moment is a signal end moment of the previous first sub-signal and a signal start moment of the subsequent first sub-signal.

Specifically, that the signal phases of any two adjacent first sub-signals in the M first sub-signals at the transition moment are continuous means that, from a perspective of a waveform in the time domain, any two first sub-signals that are continuous in the time domain are a continuous signal without a point of discontinuity.

By ensuring that the phases of any two adjacent first sub-signals in the M first sub-signals that are continuous in the time domain and that have the same subcarrier frequency at the transition moment are continuous, in a range of a first preset frequency apart from the reference subcarrier frequency, the sent first signal is orthogonal to the sent second signal.

Optionally, generating a first signal to be sent includes performing, in the first signal, the following operation on each subcarrier of at least one subcarrier corresponding to a subcarrier frequency in a range of a first preset frequency apart from a reference subcarrier frequency: generating, according to M first modulation symbols and on the subcarrier, M first sub-signals that are continuous in a time domain and that have a same subcarrier frequency. Amplitudes of the M first modulation symbols are the same, and a phase difference between any two adjacent first modulation symbols in the time domain in the M first modulation symbols is determined based on a time length of a cyclic prefix corresponding to a subsequent first modulation symbol in the two adjacent first modulation symbols.

Further, the M first sub-signals that are continuous in the time domain and that have the same subcarrier frequency and a second sub-signal to be sent are generated. A start moment of a group of signals including the M first sub-signals is the same as a start moment of the second sub-signal. This can ensure that two signals are time-aligned when being sent, so as to avoid interference caused because signals with different subcarrier frequency spacings are not time-aligned.

Figure 8:
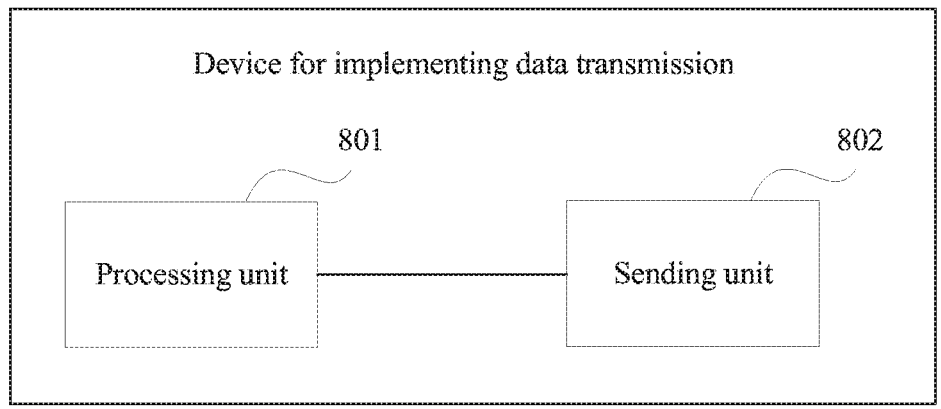
FIG. 8 is a schematic diagram of an apparatus for implementing data transmission according to an embodiment of the present disclosure.

An embodiment of the present disclosure further provides an apparatus for implementing data transmission. As shown in FIG. 8, the apparatus includes a processing unit 801 that is configured to generate a first signal to be sent. The first signal includes multiple first sub-signals. A subcarrier frequency spacing of each first sub-signal is M times as large as a subcarrier frequency spacing of each second sub-signal included in a second signal, M being a positive integer greater than 1. The second signal is adjacent to the first signal in a frequency domain. The apparatus further includes a sending unit 802 that is configured to perform the following operation on each first sub-signal generated by the processing unit 801: sending the first sub-signal carried on a subcarrier corresponding to a subcarrier frequency of the first sub-signal.

The processing unit 801 is configured to generate the first signal to be sent using at least one of the following solutions.

A first implementation solution includes generating, according to at least one first modulation symbol and in the first signal, at least one first sub-signal sent on at least one subcarrier corresponding to a subcarrier frequency in a range of a first preset frequency apart from a reference subcarrier frequency. All of the at least one first modulation symbol are preset non-zero symbols, or some of the at least one first modulation symbol are preset non-zero symbols and the rest of the at least one first modulation symbol are zero symbols. The reference subcarrier frequency is a subcarrier frequency of the first sub-signal adjacent to the second signal in the frequency domain.

For the first signal with the subcarrier frequency spacing of 30 KHz, when a distance between subcarrier frequencies of the first signal and the second signal is larger, interference of the second signal to the first signal becomes lower. Therefore, the first preset frequency meets the following condition: When the distance between the subcarrier frequencies of the first signal and the second signal is greater than the first preset frequency, the interference may be ignored.

It should be noted that sending of the first signal may not be limited outside the range of the first preset frequency apart from the reference subcarrier frequency.

Therefore, the first signal including all the first sub-signals generated according to the preset non-zero symbol may be used for channel estimation and measurement. For example, the first signal may be used as a pilot signal or a reference signal. Because the second signal does not interfere with the first signal, after the first signal and the second signal are received, the first signal may be correctly demodulated, and then the first signal is canceled as an interference signal, and the second signal is successfully demodulated.

A second implementation solution includes performing, in the first signal, the following operation on each subcarrier of at least one subcarrier corresponding to a subcarrier frequency in a range of a first preset frequency apart from a reference subcarrier frequency: generating M first sub-signals sent on the subcarrier. The M first sub-signals are continuous in a time domain and have a same subcarrier frequency, and phases of any two first sub-signals that are continuous in the time domain and that are in the M first sub-signals are continuous at a transition moment. The two first sub-signals that are continuous in the time domain include a previous first sub-signal and a subsequent first sub-signal, and the transition moment is a signal end moment of the previous first sub-signal and a signal start moment of the subsequent first sub-signal.

By ensuring that the phases of any two adjacent first sub-signals in the M first sub-signals that are continuous in the time domain and that have the same subcarrier frequency at the transition moment are continuous, in a range of a first preset frequency apart from the reference subcarrier frequency, the sent first signal is orthogonal to the sent second signal, so as to reduce interference of the first signal to the second signal.

A third implementation solution includes performing, in the first signal, the following operation on each subcarrier of at least one subcarrier corresponding to a subcarrier frequency in a range of a first preset frequency apart from a reference subcarrier frequency: generating, according to M first modulation symbols and on the subcarrier, M first sub-signals that are continuous in a time domain and that have a same subcarrier frequency.

Amplitudes of the M first modulation symbols are the same, and a phase difference between any two adjacent first modulation symbols in the time domain in the M first modulation symbols is determined based on a time length of a cyclic prefix corresponding to a subsequent first modulation symbol in the two adjacent first modulation symbols.

Optionally, the phase difference is obtained by multiplying a subcarrier angular frequency corresponding to a previous first modulation symbol in the two adjacent first modulation symbols by the time length of the cyclic prefix corresponding to the subsequent first modulation symbol in the two adjacent first modulation symbols.

Optionally, when generating the M first sub-signals sent on the subcarrier, the processing unit 801 is configured to generate, on the subcarrier, the M first sub-signals that are continuous in the time domain and that have the same subcarrier frequency.

A start moment of a group of signals including the M first sub-signals is the same as a start moment of a second sub-signal.

Figure 9:
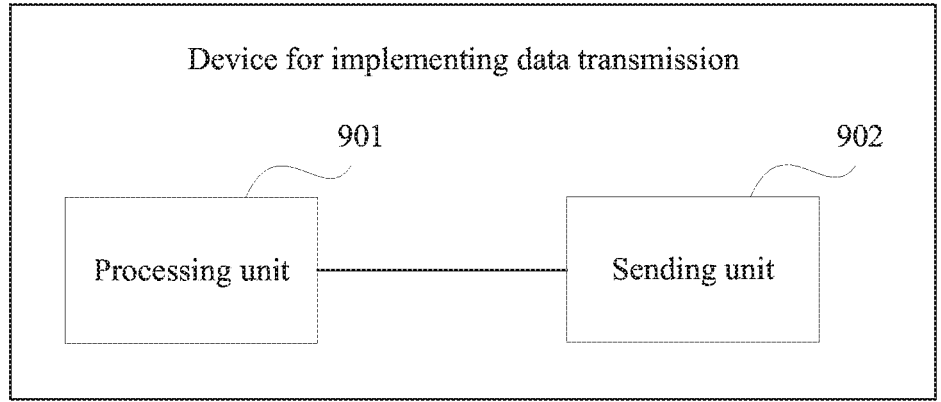
FIG. 9 is a schematic diagram of another apparatus for implementing data transmission according to an embodiment of the present disclosure.

An embodiment of the present disclosure further provides an apparatus for implementing data transmission. As shown in FIG. 9, the apparatus includes a processing unit 901 that is configured to generate a second signal to be sent. The second signal includes multiple second sub-signals. A subcarrier frequency spacing of each first sub-signal included in a first signal is M times as large as a subcarrier frequency spacing of each second sub-signal, M being a positive integer greater than 1. The second signal is adjacent to the first signal in a frequency domain. The apparatus further includes a sending unit 902 that is configured to perform the following operation on each second sub-signal generated by the processing unit 901: sending the second sub-signal carried on a subcarrier corresponding to a subcarrier frequency of the second sub-signal. In the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal. All the second sub-signals sent on each subcarrier corresponding to a subcarrier frequency whose difference from the reference subcarrier frequency is a non-integer multiple of the subcarrier frequency spacing of the first sub-signal are zero signals. The reference subcarrier frequency is a subcarrier frequency of the first sub-signal adjacent to the second signal in the frequency domain.

Optionally, processing unit 901 is configured to generate a second sub-signal to be sent on each subcarrier of the second signal.

A start moment of a group of signals including M first sub-signals that are continuous in a time domain and that have a same subcarrier frequency is the same as a start moment of a second sub-signal to be sent.

Processing unit 901 is further configured to implement a function implemented by processing unit 801 described in the embodiment corresponding to FIG. 8, and sending unit 902 is further configured to implement a function implemented by sending unit 802 described in the embodiment corresponding to FIG. 8.

Figure 10:
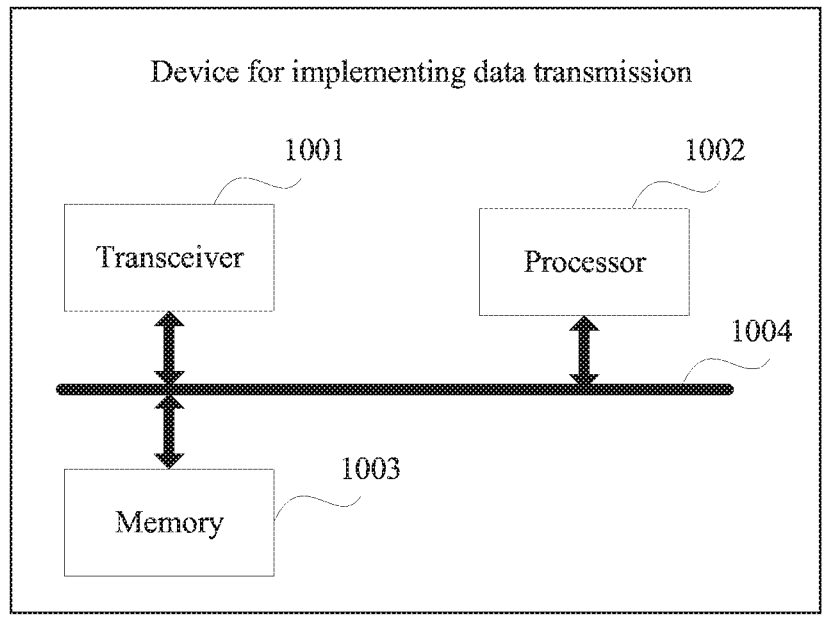
FIG. 10 is a schematic diagram of a device for implementing data transmission according to an embodiment of the present disclosure.

Based on the method and the apparatus for implementing data transmission provided in the foregoing embodiments, an embodiment of the present disclosure further provides an apparatus for implementing data transmission. As shown in FIG. 10, the device includes a transceiver 1001, a processor 1002, and a memory 1003. Transceiver 1001, processor 1002, and memory 1003 are connected to each other. A specific connection medium between the foregoing components is not limited in this embodiment of the present disclosure. In this embodiment of the present disclosure, in FIG. 10, memory 1003, processor 1002, and transceiver 1001 are connected to each other using a bus 1004, and bus 1004 is represented by a thick line in FIG. 10. A manner in which other components are connected is merely an example for description and is not intended to be limiting. The bus may be an address bus, a data bus, a control bus, and the like. For ease of representation, only one thick line is used in FIG. 10 to represent bus 1004, but it does not indicate that the disclosure is limited to only one bus or one type of bus.

In this embodiment of the present disclosure, memory 1003 is configured to store program code to be executed by processor 1002, and may be a volatile memory, for example, a random-access memory (RAM); or memory 1003 may be a non-volatile memory, for example, a read-only memory (ROM), a flash memory, a hard disk drive (HDD), or a solid state drive (SSD); or memory 1003 is any other medium that can be configured to carry or store expected program code in a form of an instruction or a data structure and that can be accessed by a computer; however, memory 1003 is not limited thereto. Memory 1003 may be a combination of the foregoing memories.

In this embodiment of the present disclosure, processor 1002 may be a central processing unit (CPU).

Processor 1002 is configured to generate a first signal to be sent.

The first signal includes multiple first sub-signals. A subcarrier frequency spacing of each first sub-signal is M times as large as a subcarrier frequency spacing of each second sub-signal included in a second signal, M being a positive integer greater than 1. The second signal is adjacent to the first signal in a frequency domain.

Transceiver 1001 is configured to perform the following operation on each first sub-signal generated by processor 1002: sending the first sub-signal carried on a subcarrier corresponding to a subcarrier frequency of the first sub-signal.

Processor 1002 is configured to generate the first signal to be sent using at least one of the following solutions.

A first implementation solution includes generating, according to at least one first modulation symbol and in the first signal, at least one first sub-signal sent on at least one subcarrier corresponding to a subcarrier frequency in a range of a first preset frequency apart from a reference subcarrier frequency. All of the at least one first modulation symbol are preset non-zero symbols, or some of the at least one first modulation symbol are preset non-zero symbols and the rest of the at least one first modulation symbol are zero symbols. The reference subcarrier frequency is a subcarrier frequency of the first sub-signal adjacent to the second signal in the frequency domain.

A second implementation solution includes performing, in the first signal, the following operation on each subcarrier of at least one subcarrier corresponding to a subcarrier frequency in a range of a first preset frequency apart from a reference subcarrier frequency: generating M first sub-signals sent on the subcarrier.

The M first sub-signals are continuous in a time domain and have a same subcarrier frequency, and phases of any two first sub-signals that are continuous in the time domain and that are in the M first sub-signals are continuous at a transition moment. The two first sub-signals that are continuous in the time domain include a previous first sub-signal and a subsequent first sub-signal, and the transition moment is a signal end moment of the previous first sub-signal and a signal start moment of the subsequent first sub-signal.

A third implementation solution includes performing, in the first signal, the following operation on each subcarrier of at least one subcarrier corresponding to a subcarrier frequency in a range of a first preset frequency apart from a reference subcarrier frequency: generating, according to M first modulation symbols and on the subcarrier, M first sub-signals that are continuous in a time domain and that have a same subcarrier frequency.

Amplitudes of the M first modulation symbols are the same, and a phase difference between any two adjacent first modulation symbols in the time domain in the M first modulation symbols is determined based on a time length of a cyclic prefix corresponding to a subsequent first modulation symbol in the two adjacent first modulation symbols.

The phase difference is obtained by multiplying a subcarrier angular frequency corresponding to a previous first modulation symbol in the two adjacent first modulation symbols by the time length of the cyclic prefix corresponding to the subsequent first modulation symbol in the two adjacent first modulation symbols.

When generating the M first sub-signals sent on the subcarrier, processor 1002 is configured to generate, on the subcarrier, the M first sub-signals that are continuous in the time domain and that have the same subcarrier frequency.

A start moment of a group of signals including the M first sub-signals is the same as a start moment of a second sub-signal.

Figure 11:
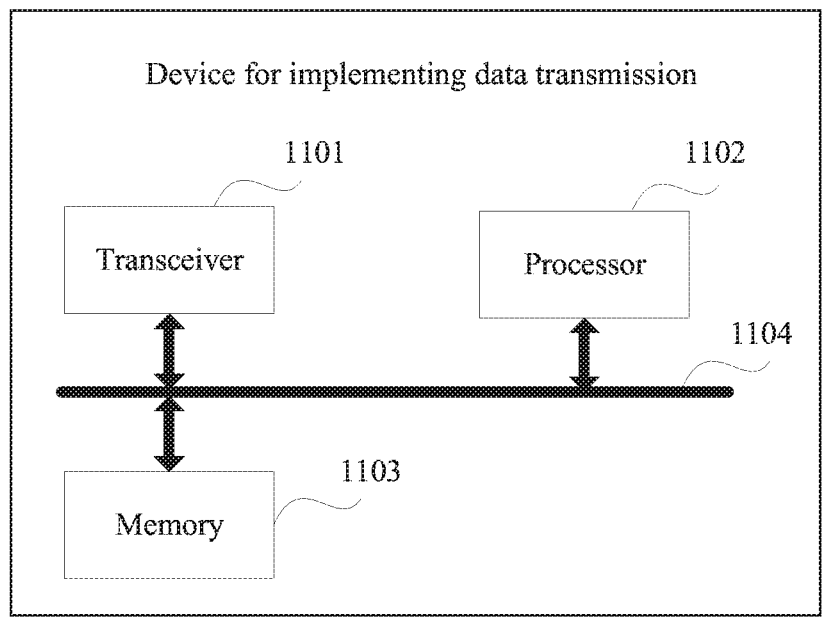
FIG. 11 is a schematic diagram of another device for implementing data transmission according to an embodiment of the present disclosure.

Based on the method and the apparatus for implementing data transmission provided in the foregoing embodiments, an embodiment of the present disclosure further provides an apparatus for implementing data transmission. As shown in FIG. 11, the device includes a transceiver 1101, a processor 1102, and a memory 1103. Transceiver 1101, processor 1102, and memory 1103 are connected to each other. A specific connection medium between the foregoing components is not limited in this embodiment of the present disclosure. In this embodiment of the present disclosure, in FIG. 11, memory 1103, processor 1102, and transceiver 1101 are connected to each other using a bus 1104, and bus 1104 is represented by a thick line in FIG. 11. A manner in which other components are connected is merely an example for description and is not intended to be limiting. Bus 1104 may be an address bus, a data bus, a control bus, and the like. For ease of representation, only one thick line is used in FIG. 11 to represent the bus, but it does not indicate that the disclosure is limited to only one bus or one type of bus.

In this embodiment of the present disclosure, memory 1103 is configured to store program code to be executed by processor 1102, and may be a volatile memory, for example, RAM; or memory 1103 may be a non-volatile memory, for example, ROM, a flash memory, a HDD, or an SSD; or memory 1103 is any other medium that can be configured to carry or store expected program code in a form of an instruction or a data structure and that can be accessed by a computer; however, memory 1103 is not limited thereto. Memory 1103 may be a combination of the foregoing memories.

In this embodiment of the present disclosure, processor 1102 may be a CPU.

Processor 1102 is configured to generate a second signal to be sent.

The second signal includes multiple second sub-signals. A subcarrier frequency spacing of each first sub-signal included in a first signal is M times as large as a subcarrier frequency spacing of each second sub-signal, M being a positive integer greater than 1, The second signal is adjacent to the first signal in a frequency domain.

Transceiver 1101 is configured to perform the following operation on each second sub-signal generated by processor 1102: sending the second sub-signal carried on a subcarrier corresponding to a subcarrier frequency of the second sub-signal.

In the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal. All the second sub-signals sent on each subcarrier corresponding to a subcarrier frequency whose difference from the reference subcarrier frequency is a non-integer multiple of the subcarrier frequency spacing of the first sub-signal are zero signals. The reference subcarrier frequency is a subcarrier frequency of the first sub-signal adjacent to the second signal in the frequency domain.

Optionally, processor 1102 is configured to generate a second sub-signal to be sent on each subcarrier of the second signal.

A start moment of a group of signals including M first sub-signals that are continuous in a time domain and that have a same subcarrier frequency is the same as a start moment of a second sub-signal to be sent.

Optionally, processor 1102 is further configured to implement a function implemented by processor 1002 described in FIG. 10, and transceiver 1101 is further configured to implement a function implemented by transceiver 1001 described in FIG. 10.

According to the solution provided in this embodiment of the present disclosure, in a range of a first preset frequency apart from a reference subcarrier frequency, a second signal is sent on a subcarrier corresponding to a subcarrier frequency whose difference from the reference subcarrier frequency is an integer multiple of subcarrier frequency spacing of a first signal, and no signal is sent on the rest of subcarriers. This can ensure that the second signal does not interfere with the first signal in the range of the first preset frequency apart from the reference subcarrier frequency, so as to avoid a waste of frequency resources caused when no signal is sent within a frequency guard band. Therefore, the first signal including all first sub-signals generated according to a preset non-zero symbol may be used for channel estimation and measurement. For example, the first signal may be used as a pilot signal or a reference signal. Because the second signal does not interfere with the first signal, alternatively, by ensuring that phases of any two adjacent first sub-signals in M first sub-signals that are continuous in a time domain and that have a same subcarrier frequency are continuous at a transition moment, in a range of a first preset frequency apart from the reference subcarrier frequency, the sent first signal is orthogonal to the sent second signal, so as to reduce interference of the first signal to the second signal.

Persons skilled in the art should understand that embodiments of the present disclosure may be provided as a method, a system, or a computer program product. Therefore, the present disclosure may use a form of hardware only embodiments, software only embodiments, or embodiments with a combination of software and hardware. In addition, the present disclosure may use a form of a computer program product that is implemented on one or more computer-usable storage media (including but not limited to a disk memory, a CD-ROM, an optical memory, and the like) that include computer-usable program code.

The present disclosure is described with reference to the flowcharts and/or block diagrams of the method, the device (system), and the computer program product according to the embodiments of the present disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer-readable memory that can instruct the computer or any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or other programmable device provide steps for implementing a specific function in one or more processes in the flowcharts and/or in one or more blocks in the block diagrams.

Although some preferred embodiments of the present disclosure have been described, persons skilled in the art can make changes and modifications to these embodiments once they learn the basic inventive concept. Therefore, the following claims are intended to be construed as to cover the preferred embodiments and all changes and modifications falling within the scope of the present disclosure.

Persons skilled in the art can make various modifications and variations to the embodiments of the present disclosure without departing from the spirit and scope of the embodiments of the present disclosure. The present disclosure is intended to cover these modifications and variations provided that they fall within the scope of protection defined by the following claims and their equivalent technologies.

What is claimed is:

1. A method, comprising:
    generating, by a processing device, a second signal that comprises multiple second sub-signals, a subcarrier frequency spacing of first sub-signals of a first signal being M times as large as a subcarrier frequency spacing of each second sub-signal, M being a positive integer greater than 1, the second signal being adjacent to the first signal in a frequency domain; and
    sending, by the processing device and for each second sub-signal of the second signal, the second sub-signal carried on a subcarrier corresponding to a subcarrier frequency of the second sub-signal, wherein:
        in the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal;
        the second sub-signals sent on each subcarrier corresponding to a subcarrier frequency whose difference from the reference subcarrier frequency is a non-integer multiple of the subcarrier frequency spacing of the first sub-signal are zero signals; and
        the reference subcarrier frequency is a subcarrier frequency of the first sub-signal adjacent to the second signal in the frequency domain.

2. The method according to claim 1, wherein:
generating the second signal that comprises multiple second sub-signals comprises generating a second sub-signal to be sent on each subcarrier of the second signal; and
a start moment of a group of signals that comprises M first sub-signals of the first sub-signals of the first signal is the same as a start moment of a second sub-signal to be sent, the M first sub-signals of the group of signals being continuous in a time domain and having a same subcarrier frequency.

3. The method according to claim 1, further comprising:
generating the first signal that comprises the first sub-signals; and
sending, for each first sub-signal of the first signal, the first sub-signal carried on a subcarrier corresponding to a subcarrier frequency of the first sub-signal, wherein:
generating the first signal comprises generating, in the first signal and according to at least one first modulation symbol, at least one first sub-signal sent on at least one subcarrier corresponding to a subcarrier frequency in a range of a first preset frequency apart from a reference subcarrier frequency, the reference subcarrier frequency being a subcarrier frequency of the first sub-signal adjacent to the second signal in the frequency domain, wherein:
all of the first modulation symbols of the at least one first modulation symbol are preset non-zero symbols, or
the at least one first modulation symbol comprises multiple first modulation symbols, and some of the first modulation symbols are preset non-zero symbols and the rest of the first modulation symbols are zero symbols.

4. The method according to claim 1, further comprising:
generating the first signal that comprises the first sub-signals; and
sending, for each first sub-signal of the first signal, the first sub-signal carried on a subcarrier corresponding to a subcarrier frequency of the first sub-signal, wherein:
generating the first signal comprises generating, in the first signal for each subcarrier of at least one subcarrier corresponding to a subcarrier frequency in a range of a first preset frequency apart from a reference subcarrier frequency, M first sub-signals of the first sub-signals of the first signal sent on the subcarrier; and
the M first sub-signals are continuous in a time domain and have a same subcarrier frequency, phases of any two first sub-signals that are continuous in the time domain and that are in the M first sub-signals being continuous at a transition moment, the two first sub-signals that are continuous in the time domain comprising a previous first sub-signal and a subsequent first sub-signal, the transition moment being a signal end moment of the previous first sub-signal and a signal start moment of the subsequent first sub-signal.

5. The method according to claim 4, wherein:
generating the M first sub-signals sent on the subcarrier comprises generating, on the subcarrier, the M first sub-signals that are continuous in the time domain and that have the same subcarrier frequency; and
a start moment of a group of signals that comprises the M first sub-signals is the same as a start moment of a second sub-signal of the multiple second sub-signals.

6. The method according to claim 1, further comprising:
generating the first signal that comprises the first sub-signals; and
sending, for each first sub-signal of the first signal, the first sub-signal carried on a subcarrier corresponding to a subcarrier frequency of the first sub-signal, wherein:
generating the first signal comprises generating, in the first signal for each subcarrier of at least one subcarrier corresponding to a subcarrier frequency in a range of a first preset frequency apart from a reference subcarrier frequency and according to M first modulation symbols, M first sub-signals of the first sub-signals of the first signal that are continuous in a time domain and that have a same subcarrier frequency; and
amplitudes of the M first modulation symbols are the same, a phase difference between any two adjacent first modulation symbols in the time domain in the M first modulation symbols being determined based on a time length of a cyclic prefix corresponding to a subsequent first modulation symbol in the two adjacent first modulation symbols.

7. The method according to claim 6, wherein the phase difference is obtained by multiplying a subcarrier angular frequency corresponding to a previous first modulation symbol in the two adjacent first modulation symbols by the time length of the cyclic prefix corresponding to the subsequent first modulation symbol in the two adjacent first modulation symbols.

8. The method according to claim 6, wherein generating the M first sub-signals comprises:
generating, on the subcarrier, the M first sub-signals that are continuous in the time domain and that have the same subcarrier frequency, wherein
a start moment of a group of signals that comprises the M first sub-signals is the same as a start moment of a second sub-signal of the multiple second sub-signals.

9. An apparatus, comprising:
one or more processors;
a non-transitory computer-readable medium comprising logic, the logic configured to, when executed by the one or more processors, cause the one or more processors to perform operations comprising generating a second signal that comprises multiple second sub-signals, a subcarrier frequency spacing of first sub-signals of a first signal being M times as large as a subcarrier frequency spacing of each second sub-signal, M being a positive integer greater than 1, the second signal being adjacent to the first signal in a frequency domain; and
a transmitter configured to send, for each second sub-signal generated by the one or more processors, the second sub-signal carried on a subcarrier corresponding to a subcarrier frequency of the second sub-signal, wherein:
in the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal;
the second sub-signals sent on each subcarrier corresponding to a subcarrier frequency whose difference from the reference subcarrier frequency is a non-integer multiple of the subcarrier frequency spacing of the first sub-signal are zero signals; and
the reference subcarrier frequency is a subcarrier frequency of the first sub-signal adjacent to the second signal in the frequency domain.

10. The apparatus according to claim 9, wherein:
generating the second signal that comprises the multiple second sub-signals comprises generating a second sub-signal to be sent on each subcarrier of the second signal; and
a start moment of a group of signals that comprises M first sub-signals of the first sub-signals of the first signal is the same as a start moment of a second sub-signal to be sent, the M first sub-signals of the group of signals being continuous in a time domain and having a same subcarrier frequency.

11. The apparatus according to claim 9, wherein:
the operations further comprise generating the first signal that comprises the first sub-signals;
the transmitter is configured to send, for each first sub-signal of the first signal, the first sub-signal carried on a subcarrier corresponding to a subcarrier frequency of the first sub-signal; and
generating the first signal comprises generating, in the first signal and according to at least one first modulation symbol, at least one first sub-signal sent on at least one subcarrier corresponding to a subcarrier frequency in a range of a first preset frequency apart from a reference subcarrier frequency, wherein the reference subcarrier frequency is a subcarrier frequency of the first sub-signal adjacent to the second signal in the frequency domain and:
all of the first modulation symbols of the at least one first modulation symbol are preset non-zero symbols; or
the at least one first modulation symbol comprises multiple first modulation symbols, and some of the first modulation symbols are preset non-zero symbols and the rest of the first modulation symbols are zero symbols.

12. The apparatus according to claim 9, wherein
the operations further comprise generating the first signal that comprises the first sub-signals;
the transmitter is configured to send, for each first sub-signal of the first signal, the first sub-signal carried on a subcarrier corresponding to a subcarrier frequency of the first sub-signal; and
generating the first signal comprises generating, in the first signal for each subcarrier of at least one subcarrier corresponding to a subcarrier frequency in a range of a first preset frequency apart from a reference subcarrier frequency, M first sub-signals of the first sub-signals of the first signal sent on the subcarrier;
wherein the M first sub-signals are continuous in a time domain and have a same subcarrier frequency, phases of any two first sub-signals that are continuous in the time domain and that are in the M first sub-signals are continuous at a transition moment, the two first sub-signals that are continuous in the time domain comprising a previous first sub-signal and a subsequent first sub-signal, the transition moment being a signal end moment of the previous first sub-signal and a signal start moment of the subsequent first sub-signal.

13. The apparatus according to claim 12, wherein:
the operations further comprise, when generating the M first sub-signals sent on the subcarrier, generating, on the subcarrier, the M first sub-signals to be continuous in the time domain and to have the same subcarrier frequency; and
a start moment of a group of signals that comprises the M first sub-signals is the same as a start moment of a second sub-signal of the multiple second sub-signals.

14. The apparatus according to claim 9, wherein:
the operations further comprise generating the first signal that comprises the first sub-signals;
the transmitter is configured to send, for each first sub-signal of the first signal, the first sub-signal carried on a subcarrier corresponding to a subcarrier frequency of the first sub-signal; and
generating the first signal comprises generating, in the first signal for each subcarrier of at least one subcarrier corresponding to a subcarrier frequency in a range of a first preset frequency apart from a reference subcarrier frequency and according to M first modulation symbols, M first sub-signals of the first sub-signals of the first signal that are continuous in a time domain and that have a same subcarrier frequency;
wherein amplitudes of the M first modulation symbols are the same, a phase difference between any two adjacent first modulation symbols in the time domain in the M first modulation symbols being determined based on a time length of a cyclic prefix corresponding to a subsequent first modulation symbol in the two adjacent first modulation symbols.

15. The apparatus according to claim 14, wherein the phase difference is obtained by multiplying a subcarrier angular frequency corresponding to a previous first modulation symbol in the two adjacent first modulation symbols by the time length of the cyclic prefix corresponding to the subsequent first modulation symbol in the two adjacent first modulation symbols.

16. The apparatus according to claim 14, wherein:
the operations further comprise, when generating the M first sub-signals sent on the subcarrier, generating, on the subcarrier, the M first sub-signals to be continuous in the time domain and to have the same subcarrier frequency; and
a start moment of a group of signals that comprises the M first sub-signals is the same as a start moment of a second sub-signal of the multiple second sub-signals.

17. A non-transitory computer-readable medium comprising logic, the logic configured when executed by one or more processors to cause the one or more processors to perform operations comprising:
generating a second signal that comprises multiple second sub-signals, a subcarrier frequency spacing of first sub-signals of a first signal being M times as large as a subcarrier frequency spacing of each second sub-signal, M being a positive integer greater than 1, the second signal being adjacent to the first signal in a frequency domain; and
sending, for each second sub-signal of the second signal, the second sub-signal carried on a subcarrier corresponding to a subcarrier frequency of the second sub-signal, wherein:
in the second signal, and in a range of a first preset frequency apart from a reference subcarrier frequency, at least one second sub-signal sent on at least one subcarrier corresponding to a subcarrier frequency whose difference from the reference subcarrier frequency is an integer multiple of the subcarrier frequency spacing of the first sub-signal is a non-zero signal;
the second sub-signals sent on each subcarrier corresponding to a subcarrier frequency whose difference from the reference subcarrier frequency is a non-integer multiple of the subcarrier frequency spacing of the first sub-signal are zero signals; and the reference subcarrier frequency is a subcarrier frequency of the first sub-signal adjacent to the second signal in the frequency domain.

18. The non-transitory computer-readable medium according to claim 17, wherein the operations further comprise:
generating the first signal that comprises the first sub-signals; and
sending, for each first sub-signal of the first signal, the first sub-signal carried on a subcarrier corresponding to a subcarrier frequency of the first sub-signal, wherein:
generating the first signal comprises generating, in the first signal and according to at least one first modulation symbol, at least one first sub-signal sent on at least one subcarrier corresponding to a subcarrier frequency in a range of a first preset frequency apart from a reference subcarrier frequency, the reference subcarrier frequency being a subcarrier frequency of the first sub-signal adjacent to the second signal in the frequency domain, wherein:
all of the first modulation symbols of the at least one first modulation symbol are preset non-zero symbols, or
the at least one first modulation symbol comprises multiple first modulation symbols, and some of the first modulation symbols are preset non-zero symbols and the rest of the first modulation symbols are zero symbols.

19. The non-transitory computer-readable medium according to claim 17, wherein the operations further comprise:
generating the first signal that comprises the first sub-signals; and
sending, for each first sub-signal of the first signal, the first sub-signal carried on a subcarrier corresponding to a subcarrier frequency of the first sub-signal, wherein:
generating the first signal comprises generating, in the first signal for each subcarrier of at least one subcarrier corresponding to a subcarrier frequency in a range of a first preset frequency apart from a reference subcarrier frequency, M first sub-signals of the first sub-signals of the first signal sent on the subcarrier; and
the M first sub-signals are continuous in a time domain and have a same subcarrier frequency, phases of any two first sub-signals that are continuous in the time domain and that are in the M first sub-signals being continuous at a transition moment, the two first sub-signals that are continuous in the time domain comprising a previous first sub-signal and a subsequent first sub-signal, the transition moment being a signal end moment of the previous first sub-signal and a signal start moment of the subsequent first sub-signal.

20. The non-transitory computer-readable medium according to claim 17, wherein the operations further comprise:
generating the first signal that comprises the first sub-signals; and
sending, for each first sub-signal of the first signal, the first sub-signal carried on a subcarrier corresponding to a subcarrier frequency of the first sub-signal, wherein:
generating the first signal comprises generating, in the first signal for each subcarrier of at least one subcarrier corresponding to a subcarrier frequency in a range of a first preset frequency apart from a reference subcarrier frequency and according to M first modulation symbols, M first sub-signals of the first sub-signals of the first signal that are continuous in a time domain and that have a same subcarrier frequency; and
amplitudes of the M first modulation symbols are the same, a phase difference between any two adjacent first modulation symbols in the time domain in the M first modulation symbols being determined based on a time length of a cyclic prefix corresponding to a subsequent first modulation symbol in the two adjacent first modulation symbols.

* * * * *